United States Patent [19]

Yoshida

[11] Patent Number: 5,050,145
[45] Date of Patent: Sep. 17, 1991

[54] OPTICAL DISK RECORDING AND REPRODUCING APPARATUS HAVING FASTER REPRODUCING SPEED THAN RECORDING SPEED

[75] Inventor: Tadao Yoshida, Kanagawa, Japan

[73] Assignee: Sony Corporation, Tokyo, Japan

[21] Appl. No.: 468,245

[22] Filed: Jan. 22, 1990

[30] Foreign Application Priority Data

Feb. 14, 1989 [JP] Japan .................................. 1-34486

[51] Int. Cl.$^5$ ............................................. G11B 13/04
[52] U.S. Cl. .................................. 369/13; 360/73.01; 360/73.03; 369/189; 369/239
[58] Field of Search ................. 369/13, 32, 47, 54, 369/58, 59, 189, 239; 360/8, 73.01, 73.03, 114, 59

[56] References Cited

U.S. PATENT DOCUMENTS

| | | | |
|---|---|---|---|
| 3,709,503 | 1/1973 | Kamio et al. | 369/239 |
| 3,855,424 | 12/1974 | Tharmaratnam et al. | 360/8 |
| 4,710,825 | 12/1987 | Okita et al. | 369/239 |
| 4,733,385 | 3/1988 | Henmi et al. | 369/13 |
| 4,789,975 | 12/1988 | Taniyama | 369/59 |

FOREIGN PATENT DOCUMENTS

| | | |
|---|---|---|
| 241007 | 8/1987 | European Pat. Off. . |
| 62-146464 | 6/1987 | Japan . |
| 62-189654 | 8/1987 | Japan . |
| 62-219367 | 9/1987 | Japan . |
| 63-112869 | 5/1988 | Japan . |

Primary Examiner—Stuart S. Levy
Assistant Examiner—Hoa Nguyen
Attorney, Agent, or Firm—Lewis H. Eslinger; Jay H. Maioli

[57] ABSTRACT

An optomagnetic disk recording and reproducing apparatus includes an optomagnetic disk having a vertical magnetic film capable of recording and reproducing an information signal, a recording and reproducing head unit for recording an information signal in the optomagnetic disk and reproducing an information signal recorded in the optomagnetic disk, a spindle motor for rotationally driving the optomagnetic disk, and means for controlling the spindle motor such that a rotational speed of the optomagnetic disk upon reproducing of an information signal recorded in the optomagnetic disk performed by the recording and reproducing head unit is set higher than the rotational speed of the optomagnetic disk upon recording of an information signal in the optomagnetic disk performed by the recording and reproducing head unit.

3 Claims, 2 Drawing Sheets

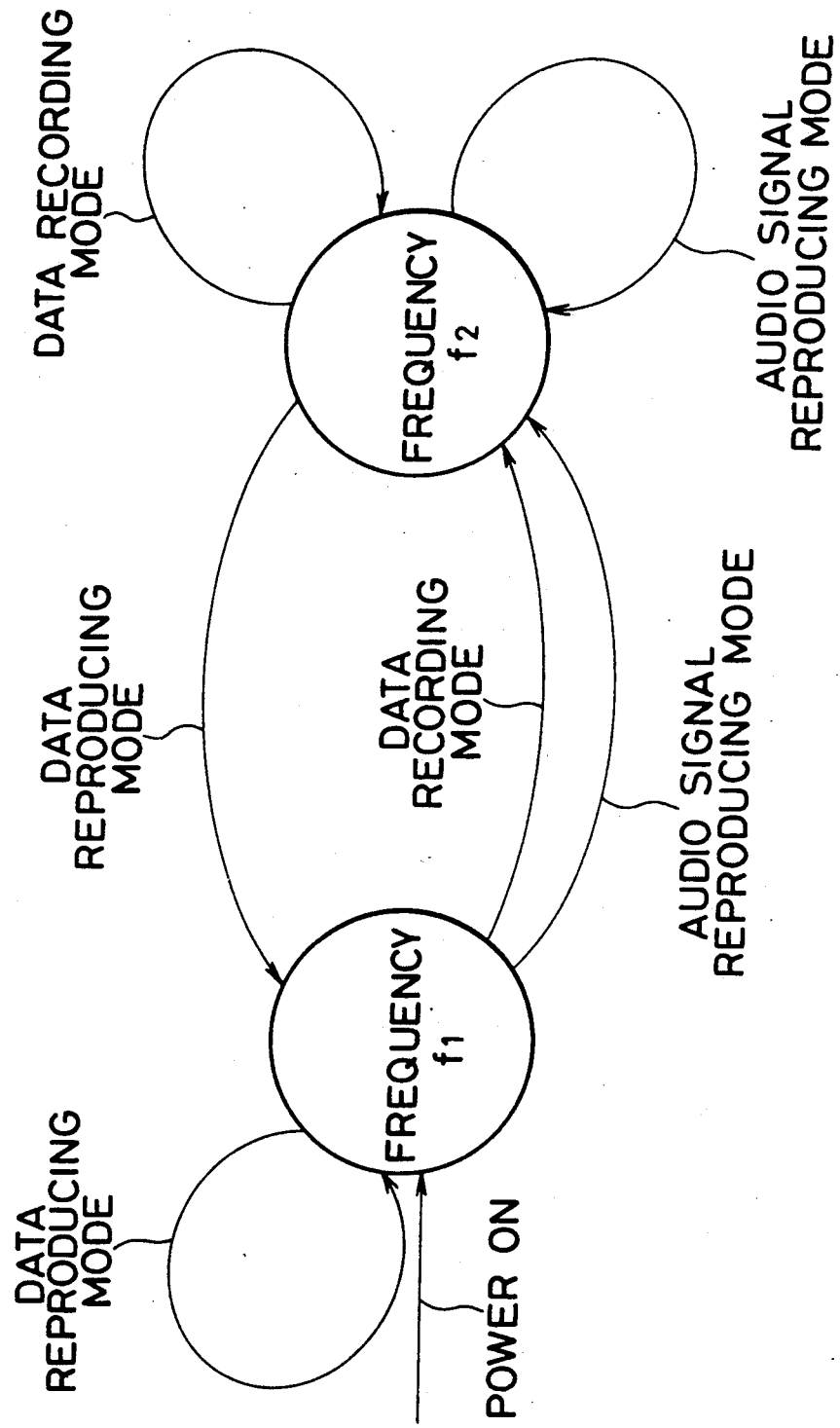

OPTICAL DISK RECORDING AND REPRODUCING APPARATUS HAVING FASTER REPRODUCING SPEED THAN RECORDING SPEED

BACKGROUND OF THE INVENTION

The present invention relates to an optical disk recording/reproducing method and, more particularly, to an optical disk recording/reproducing method which can be suitably applied to an optomagnetic disk recording/reproducing apparatus.

Conventional optomagnetic recording systems are classified into an optical modulating system in which a laser beam as recording light to be radiated on an optomagnetic recording medium is modulated on the basis of an information signal to be recorded, and a magnetic field modulating system in which an external magnetic field to be applied on an optomagnetic recording medium is modulated on the basis of an information signal to be recorded.

In an optomagnetic disk recording/reproducing apparatus of the magnetic field modulating system, a light beam emitted from a laser light source such as a semiconductor laser element is radiated to be focused on a recording medium of an optomagnetic disk by an objective lens of an optical pickup, thereby locally increasing a temperature as compared with a non-irradiated portion. In addition, a modulated magnetic field corresponding to an information signal to be recorded is applied to the optomagnetic disk by external magnetic field generating means, thereby inverting the magnetic domain of a vertical magnetic recording film as an optomagnetic recording medium of the optomagnetic disk and recording desired data.

Upon reproduction, switching control is performed so that a light amount of the light beam emitted from the laser light source is reduced to be smaller than that upon recording, and then the light beam is radiated on an optomagnetic disk. A light beam reflected by the optomagnetic disk is detected by a photodetector of the optical pickup, and data recorded on the optomagnetic disk is reproduced on the basis of the detection result.

In such a conventional optomagnetic disk recording/reproducing apparatus, the operability (use convenience) can be significantly improved by increasing a data transfer speed. In order to increase the data transfer speed, a rotational speed obtained by rotary driving means such as a spindle motor for an optomagnetic disk must be set high. Upon recording, it is desired that a switching speed for a modulated magnetic field generated from external magnetic field generating means is increased and a light amount of the light beam emitted from the laser light source is increased in correspondence with the increased rotational speed. Upon reproduction, it is desired to increase a signal processing speed for a detection signal output from the photodetector.

If, however, the switching speed for a modulated magnetic field (this modulated magnetic field is based on an information signal to be recorded generated from the external magnetic field generating means) is set high, a magnetic head as the external magnetic field generating means for generating the modulated magnetic field generates heat. Also, power consumption of a magnetic head driver is increased. In addition, it is difficult to increase a light amount of a light beam emitted from a semiconductor laser element as a laser light source upon recording. Therefore, it is difficult to increase the data transfer speed beyond a conventional speed with conventional techniques.

SUMMARY OF THE INVENTION

It is an object of the present invention to solve the above conventional problems and to provide a recording/reproducing apparatus for, e.g., an optomagnetic disk, having significantly improved operability (use convenience).

In order to solve the above problems, according to an optical disk recording/reproducing apparatus of the present invention, in an optomagnetic disk recording/reproducing method in which a light beam is radiated on an optomagnetic disk, data is sequentially recorded in the optomagnetic disk in a data recording mode, and the data recorded in the optomagnetic disk is reproduced in a data reproducing mode, a rotational speed of the optomagnetic disk in the data reproducing mode is set higher than that in the data recording mode, and a data transfer speed in the data reproducing mode is set higher than that in the data recording mode.

According to the present invention, therefore, since the rotational speed of an optical disk is switched to increase the data transfer speed in the data reproducing mode to be higher than that in the data recording mode, an optical disk recording/reproducing apparatus having significantly improved operability (use convenience) can be provided.

BRIEF DESCRIPTION OF THE DRAWINGS

FIG. 2 is a state transition view for explaining an operation of the apparatus shown in FIG. 1.

DETAILED DESCRIPTION OF THE PREFERRED EMBODIMENT

Figure 1:
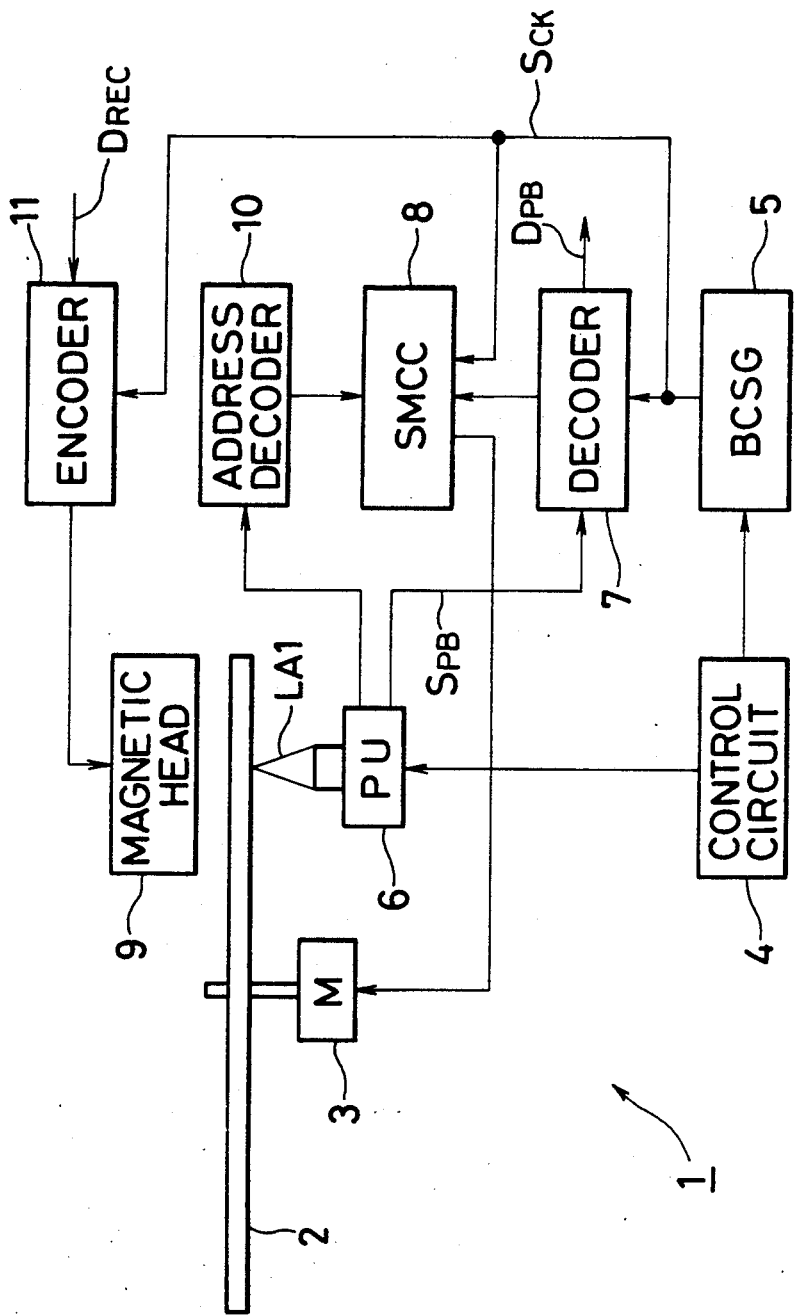
FIG. 1 is a block diagram showing an arrangement of an optomagnetic disk apparatus according to an embodiment, of the present invention.

An embodiment of the present invention will be described in detail below with reference to the accompanying drawings.

FIG. 1 is a block diagram showing an arrangement of an optomagnetic disk apparatus according to an embodiment of an optical disk recording/reproducing method of the present invention. FIG. 1 shows an optomagnetic disk recording/reproducing apparatus 1 of a magnetic field modulating system in which a modulation signal based on an information signal to be recorded is supplied to external magnetic field generating means, and a laser beam is radiated while a modulated magnetic field is applied on an optomagnetic disk, thereby recording the information signal in the optomagnetic disk. An optomagnetic disk (optical disk) 2 is obtained by coating a vertical magnetic film by, e.g., deposition or sputtering, on a substrate consisting of a synthetic resin such as a polycarbonate resin, glass, or the like and having light transparency. A preformat, i.e., a so-called pregroove for guiding a recording beam is formed on the optomagnetic disk 2. Upon recording of an information signal in the optomagnetic disk 2, the information signal is recorded along the pregroove. The optomagnetic disk 2 is driven and rotated by a spindle motor (M) 3.

An operation panel (not shown) of the optomagnetic disk recording/reproducing apparatus 1 includes a recording operation section and a switching operation section (audio reproducing operation section).

When the optomagnetic disk recording/reproducing apparatus 1 is switched on, a control circuit 4 is set in a data reproducing mode. If the recording operation section (not shown) is operated, the control circuit 4 is switched to a data recording mode. In this embodiment, if an optical pickup and a signal processor system are constituted to keep compatibility with respect to a general compact disk player, the control circuit 4 is switched to an audio signal reproducing mode when the switching operation section (not shown) for performing switching between data recording/reproducing and an audio signal is operated. In each operation mode, the control circuit 4 outputs a control signal corresponding to the operation mode to a basic clock signal generator (BCSG) 5 and an optical pickup (PU) 6. In this manner, a light emission state of a semiconductor laser element as a laser light source of the optical pickup is controlled to switch the operation mode of the optomagnetic disk recording/reproducing apparatus 1.

The basic clock signal generator 5 comprises an oscillator and the like. The basic clock signal generator 5 outputs a basic clock signal $S_{CK}$ to a decoder 7, a spindle motor control circuit (SMCC) 8 and an encoder 11. The frequency of the basic clock signal $S_{CK}$ is switched on the basis of the control signal output from the control circuit 4 in correspondence with each operation mode. In the data reproducing mode, the basic clock signal $S_{CK}$ having a frequency $f_1$ is output, as shown in FIG. 2. In the data recording mode and the audio signal reproducing mode, the basic clock signal $S_{CK}$ is switched to a frequency $f_2$. In this case, a relationship between the frequencies $f_1$ and $f_2$ is set to satisfy the following equation:

$$f_1 = 4f_2 \ldots \quad (1)$$

In the data reproducing mode and the audio signal reproducing mode, the optical pickup 6 continuously radiates a light beam LA1 on the optomagnetic disk 2. A photodetector of the optical pickup 6 detects a reflected light beam. A signal representing the detection result is output to the decoder 7. In response to the output signal supplied from the optical pickup 6, the decoder 7 reproduces a signal such as a frame sync signal recorded on the optomagnetic disk 2. In this case, the decoder 7 forms a sync signal of the reproduced frame on the basis of the basic clock signal $S_{CK}$. The decoder 7 outputs the reproduced frame sync signal together with the frame sync signal to the spindle motor control circuit 8.

On the basis of the reproduced frame sync signal and the frame sync signal output from the decoder 7, the spindle motor control circuit 8 detects the rotational speed of the optomagnetic disk 2. Note that this rotational speed detection is performed on the basis of the frequency $f_1$ or $f_2$ of the basic clock signal $S_{CK}$. Therefore, the spindle motor control circuit 8 compares phases of the reproduced frame sync signal and the frame sync signal. In accordance with the comparison result, the spindle motor control circuit 8 controls rotation of the spindle motor 3. For this reason, the optomagnetic disk 2 is rotated at a linear velocity determined by the frequency $f_1$ or $f_2$ of the basic clock signal $S_{CK}$.

In this manner, the decoder 7 outputs reproduction data $D_{PB}$. In the data reproducing mode, the reproduction data $D_{PB}$ is generated on the basis of the basic clock signal $S_{CK}$ having the frequency $f_1$. In the audio signal reproducing mode, the reproduction data $D_{PB}$ is generated on the basis of the basic clock signal $S_{CK}$ having the frequency $f_2$. Note that in the audio signal reproducing mode, the frequency $f_2$ is selected such that a data transfer speed of the reproduction data $D_{PB}$ coincides with a data transfer speed of a general compact disk player (i.e., about 150 [KB/sec]). The reproduction data $D_{PB}$ is output to a signal processor (not shown). The audio signal recorded on the optomagnetic disk 2 is reproduced by this signal processor. The signal processor operates on the basis of the basic clock signal $S_{CK}$. In this case, as the information signal to be recorded on the optomagnetic disk, information encoded along the same format as a disk format of a compact disk is recorded.

In the data reproducing mode, the frequency $f_1$ is set as a frequency of the basic clock signal $S_{CK}$. As a result, the reproduction data $D_{PB}$ having a data transfer speed four times that obtained in the audio signal reproducing mode is obtained. The optomagnetic disk recording/reproducing apparatus 1 outputs the reproduction data $D_{PB}$ to an externally connected information processing apparatus (not shown) such as a computer. In this manner, the data transfer speed upon data reproduction is increased higher than a conventional speed.

When the data recording mode is selected, the optical pickup 6 initially radiates the light beam LA1 having the same light amount as in the data reproducing mode and the audio signal reproducing mode. As in the data reproducing mode and the audio signal reproducing mode, the spindle motor control circuit 8 detects the rotational speed of the optomagnetic disk 2 on the basis of the frequency $f_2$ of the basic clock signal $S_{CK}$. The spindle motor control circuit 8 controls the spindle motor 3 in correspondence with the detected rotational speed. The spindle motor 3 is controlled by the spindle motor control circuit to rotate the optomagnetic disk 2. Therefore, in the data recording mode, the optomagnetic disk 2 is rotated at a linear velocity determined by the frequency $f_2$ of the basic clock signal $S_{CK}$.

On the basis of the frame sync signal output from the decoder 7, the optical pickup 6 and a magnetic head 9 are moved in the radial direction of the optomagnetic disk 2 to a predetermined recording region by a moving mechanism (not shown). Thereafter, the optical pickup 6 controls the semiconductor laser element to increase the light amount of the light beam LA1 emitted from the semiconductor laser element. At the same time, the optical pickup 6 switches radiation of the light beam LA1 to intermittent radiation synchronized with the basic clock signal $S_{CK}$. The optical pickup 6 causes its photodetector to receive and detect the light beam LA1 reflected by the optomagnetic disk 2. The optical pickup 6 outputs a detection signal from the photodetector to an address decoder 10.

When the radiation of the light beam LA1 is switched to the intermittent radiation as described above, the address decoder 10 detects the frame sync signal from the pregroove formed on the optomagnetic disk 2 and supplies the detected frame sync signal to the spindle motor control circuit 8.

Therefore, the spindle motor control circuit 8 can detect the rotational speed of the optomagnetic disk 2 on the basis of the frame sync signal supplied from the address decoder 10. This rotational speed detection is performed on the basis of the frequency $f_2$ of the basic clock signal $S_{CK}$. The spindle motor control circuit 8 compares phases of the reproduced frame sync signal and the frame sync signal and controls rotation of the spindle motor 3 in accordance with the comparison result. Therefore, the optomagnetic disk 2 is rotated at a linear velocity determined by the frequency $f_2$ of the basic clock signal $S_{CK}$. That is, even when the light amount of the light beam LA1 is increased to set the intermittent radiation, the optomagnetic disk 2 is rotated at a linear velocity determined by the frequency $f_2$ of the basic clock signal $S_{CK}$.

When the radiation of the light beam LA1 is switched to the intermittent radiation, the encoder 11 drives the magnetic head 9 on the basis of sequentially input data $D_{REC}$. The magnetic head 9 generates a magnetic field. In this manner, a magnetic domain orienting direction of a small region of the vertical magnetic film of the optomagnetic disk 2 intermittently irradiated with the light beam LA1 is switched in accordance with the data $D_{REC}$. That is, the data $D_{REC}$ is recorded. Therefore, in the data recording mode, since the frequency of the basic clock signal $S_{CK}$ is switched from the frequency $f_1$ in the data reproducing mode to the frequency $f_2$, the data $D_{REC}$ can be recorded in the optomagnetic disk 2 at a data transfer speed ¼ that in the data reproducing mode.

In the optomagnetic disk recording/ reproducing apparatus 1, it is difficult to increase the data transfer speed upon recording since operations of the optical pickup 6 and the magnetic head 9 are limited. Upon reproduction, however, the processing speed for an output signal from the optical pickup 6 can be increased. The data transfer speed upon reproducing can be easily increased by only increasing the signal processing speed. In addition, in the optomagnetic disk recording/reproducing apparatus 1, data reproduction is performed much more frequently than data recording.

Therefore, if the frequency of the basic clock signal $S_{CK}$ is switched to set the data transfer speed higher in the date reproducing mode, the operability (use convenience) is significantly improved as compared with that of conventional apparatuses.

In the optomagnetic disk recording/reproducing apparatus 1, data $D_{REC}$ is sometimes continuously recorded in a plurality of recording regions on the optomagnetic disk 2 in the data recording mode. Therefore, when the data recording mode is set, a recording region is detected and the data $D_{REC}$ is recorded on the basis of the frequency $f_2$. In this manner, even when the data transfer speed is to be switched, an unnecessary time required to switch the rotational speed of the optomagnetic disk 2 can be omitted. That is, a time required for data recording can be reduced.

In the above arrangement, in the data reproducing mode, the basic clock signal generator 5 outputs the basic clock signal $S_{CK}$ having the frequency $f_1$. On the basis of the frequency $f_1$ of the basic clock signal $S_{CK}$, the optomagnetic disk 2 is rotated at a predetermined linear speed. In this manner, the decoder 7 outputs the reproduction data $D_{PB}$ at a data transfer speed based on the basic clock signal $S_{CK}$ having the frequency $f_1$.

In the data recording mode, the frequency of the basic clock signal $S_{CK}$ is switched to the frequency $f_2$. A recording region of the optomagnetic disk 2 is detected in accordance with the frequency $f_2$. Thereafter, the data $D_{REC}$ is recorded in the recording region at a data transfer speed determined by the frequency $f_2$.

In the audio signal reproducing mode, the optomagnetic disk 2 is rotated on the basis of the frequency $f_2$ as in the data recording mode. The reproduction data $D_{PB}$ reproduced at the data transfer speed determined by the frequency $f_2$ is reproduced into an audio signal and output.

According to the above arrangement, the frequency of the basic clock signal $S_{CK}$ is switched to increase the data transfer speed in the data reproducing mode. As a result, the operability (use convenience) of the optomagnetic disk recording/reproducing apparatus is significantly improved.

In the above embodiment, the present invention is applied to an optomagnetic disk recording/reproducing apparatus having an audio signal reproducing mode. The present invention, however, is not limited to the above embodiment. That is, the present invention can be applied to an optomagnetic disk recording/reproducing apparatus for only recording/reproducing data.

In addition, in the above embodiment, the same data transfer speed is set in the audio signal reproducing mode and the data recording mode. The present invention, however, is not limited to the above embodiment. That is, in addition to the data reproducing mode, the data transfer speed may be switched between the audio signal reproducing mode and the data recording mode.

Furthermore, in the above embodiment, the present invention is applied to an optomagnetic disk recording-/reproducing apparatus of a magnetic field modulating system. The present invention, however, is not limited to the above embodiment. That is, the present invention can be applied to, e.g., an optomagnetic disk recording-/reproducing apparatus of an optical modulating system or an optical disk recording/reproducing apparatus for recording data by utilizing phase transition of a recording film of an optical disk. In an optical disk recording/reproducing apparatus of this type, a light beam having a large light amount must be radiated for the phase transition upon recording. To the contrary, the light amount of the light beam can be small upon reproduction. Therefore, a data transfer speed can be easily increased in a data reproducing mode, while it cannot be increased in a data recording mode. That is, such an optical disk recording/reproducing apparatus has the same problems as those of the optomagnetic disk recording/reproducing apparatus. Therefore, the present invention can be applied to the optical disk recording/reproducing apparatus of this type. Note that the phase transition means a change between amorphous and crystalline states of the material.

Moreover, in the above embodiment, an optomagnetic disk is rotated at a predetermined linear velocity. The present invention, however, is not limited to the above embodiment. That is, the optomagnetic disk may be rotated at a predetermined angular velocity.

What is claimed is:

1. An optical disk recording and reproducing apparatus comprising:

an optical disk having an optical recording medium capable of optically recording and reproducing an information signal;

recording and reproducing means for recording an information signal in said optical disk and reproducing an information signal recorded in said optical disk in a normal playback mode;

rotary driving means for rotationally driving said optical disk;

means for controlling said rotary driving means so that a rotational speed of said optical disk upon reproducing of an information signal recorded in said optical disk performed by said recording and reproducing means during the normal playback mode is higher than the rotational speed of said optical disk upon recording of an information signal in said optical disk by said recording and reproducing means; wherein said control means includes clock signal generating means for generating basic clock signals having different respective frequencies upon recorded and reproducing said optical disk by said recording and reproducing means and wherein said control means includes decoder means for detecting a frame sync signal from a detection output from said recording and reproducing means and forming a sync signal of a reproduced frame on the basis of the clock signal from said clock generating means.

2. An apparatus according to claim 1, wherein said clock signal generating means generates the basic clock signals such that a basic clock signal used for reproducing by said recording and reproducing means is of a higher frequency than a basic clock signal used for recording by said recording and reproducing means.

3. An apparatus according to claim 1, wherein said control means includes rotary driving control means for comparing phases of the frame sync signal and the reproduced frame sync signal and controlling said rotary driving means on the basis of this comparison output, and rotationally driving said rotary driving means on the basis of the clock signal from said clock generating means.

* * * * *